United States Patent
Mitchell et al.

[19]

[11] Patent Number: 5,905,610
[45] Date of Patent: May 18, 1999

[54] COMBINED READ/WRITE MAGNETIC HEAD HAVING MRE POSITIONED BETWEEN BROKEN FLUX GUIDE AND NON-MAGNETIC SUBSTRATE

[75] Inventors: Terry B. Mitchell, Robbinsdale; William P. Wood, Edina; Paul F. Michalek, Bloomington, all of Minn.

[73] Assignee: North American Philips Corporation, New York, N.Y.

[21] Appl. No.: 08/082,895

[22] Filed: Jun. 25, 1993

Related U.S. Application Data

[63] Continuation of application No. 07/703,539, May 21, 1991, abandoned.

[51] Int. Cl.$^6$ .................................................. G11B 5/39
[52] U.S. Cl. ............................................................ 360/113
[58] Field of Search .................................... 360/113, 119, 360/125, 126

[56] References Cited

U.S. PATENT DOCUMENTS

| | | | |
|---|---|---|---|
| 3,921,217 | 11/1975 | Thompson | 360/113 |
| 4,130,847 | 12/1978 | Head et al. | 360/103 |
| 4,150,408 | 4/1979 | Koel et al. | 360/113 |
| 4,504,880 | 3/1985 | Church et al. | 360/113 |
| 4,789,910 | 12/1988 | Otsuka et al. | 360/113 |
| 4,803,580 | 2/1989 | Mowry | 360/113 |
| 4,803,581 | 2/1989 | Kira et al. | 360/113 |
| 4,807,074 | 2/1989 | Kamo | 360/113 |
| 4,860,138 | 8/1989 | Vinal et al. | 360/113 |
| 4,891,725 | 1/1990 | Mowry | 360/113 |
| 4,907,113 | 3/1990 | Mallary | 360/113 |
| 4,954,920 | 9/1990 | Yamada et al. | 360/113 |
| 5,025,342 | 6/1991 | Nagata et al. | 360/126 |
| 5,079,662 | 1/1992 | Kawakami et al. | 360/113 |
| 5,097,371 | 3/1992 | Somers | 360/113 |
| 5,193,038 | 3/1993 | Smith | 360/113 |

FOREIGN PATENT DOCUMENTS 63-37811   2/1988   Japan.

OTHER PUBLICATIONS

C.H. Bajorek et al, "An Integrated Magnetoresistive Read, Inductive Write High Density Recording Head". Published Proceedings of 20th Annual Conference of Magnetism and Magnetic Materials, American Institute of Physics, New York, 1975, pp. 548–549.

*Primary Examiner*—Jefferson Evans
*Attorney, Agent, or Firm*—Welsh & Katz, Ltd.

[57] ABSTRACT

A combined read/write magnetic head is disclosed in which the read head includes a magnetoresistive element (MRE) overlying a substrate of substantially magnetically impermeable material, a broken (discontinuous) flux guide overlying the MRE and a continuous flux guide overlying the broken flux guide. The write head of the combined read/write magnetic head overlies the read head and shares the continuous flux guide with the read head, the continuous flux guide serving as a bottom pole of the write head. Significantly, the dimensions of the various elements of the combined read/write magnetic head are chosen so that relatively little magnetic flux produced by the write head during writing, or entering the write head during reading, is communicated via the shared flux guide to the MRE.

28 Claims, 2 Drawing Sheets

COMBINED READ/WRITE MAGNETIC HEAD HAVING MRE POSITIONED BETWEEN BROKEN FLUX GUIDE AND NON-MAGNETIC SUBSTRATE

This is a continuation of application Ser. No. 07/703,539, filed May 21, 1991, now abandoned.

BACKGROUND OF THE INVENTION

1. Field of the Invention

The invention pertains generally to magnetic heads, and more particularly to combined read/write magnetic heads.

2. Description of the Related Art

A write magnetic head is a device used to magnetize regions of a magnetic medium, e.g., a magnetic tape, and thereby "write" information onto the magnetic medium. A read magnetic head is a device used to detect magnetized regions on a magnetic medium, and thereby "read" information on the magnetic medium.

Conventionally, a write magnetic head includes a magnetic yoke having a gap exhibiting a relatively high magnetic reluctance, e.g., an air gap. An electric coil encircles the yoke. By passing an electric current through the coil, a magnetic field is produced extending through the yoke. The corresponding fringing magnetic field at the gap is used to magnetize regions of, and thereby write information onto, a magnetic medium, e.g., a magnetic tape, positioned adjacent to, and moving past, the gap.

A conventional read magnetic head is generally similar to the write magnetic head described above. In use, a magnetic medium, e.g., a magnetic tape, is moved past the gap in the magnetic yoke. Magnetic flux, emanating from magnetized regions in the magnetic medium, is coupled into the yoke via the gap. Time-wise variations in magnetic flux induce an output voltage across the coil encircling the magnetic yoke.

Read magnetic heads have been developed in which the output voltage is proportional to magnetic flux, rather than time-wise changes in magnetic flux. Such a read head typically employs a magnetoresistive element (MRE). As is known, when a current is passed through a unidirectionally magnetized MRE, the electrical resistance of the MRE, and therefore the voltage drop across the MRE, is related to the angle between the direction of magnetization and the direction of current flow. If the MRE is exposed to an external magnetic field, e.g., a magnetic field emanating from a magnetic tape, which external field is, for example, oriented transversely to the initial magnetization direction of the MRE, then the magnetization direction will necessarily be changed and the MRE will exhibit a corresponding change in resistance.

In general, the change in resistance of an MRE is a nonlinear function of the field strength of the external magnetic field to be sensed. To achieve a linear response, the MRE is preferably operated so that the angle between the initial magnetization direction and the direction of current flow is 45 degrees. This is accomplished, for example, by magnetizing the MRE along a direction which is at 45 degrees to a longitudinal direction of the MRE and flowing current along the longitudinal direction. Alternatively, the MRE is provided with a barber pole configuration of electrical conductors, i.e., spaced, parallel conductive strips applied to the surface of the MRE. These conductive strips, which constitute equipotential surfaces, are oriented so that electrical current in the MRE flows between the conductive strips at an angle of 45 degrees relative to the longitudinal direction of the MRE, along which the MRE is magnetized. (Regarding barber pole MREs, see U.S. Pat. No. 4,052,748 issued to K. E. Kuijk on Oct. 4, 1977.)

In the case of, for example, magnetic tapes, information is written onto, and read from, spaced, parallel tracks on the tapes. To increase information density, the width of the tracks, as well as the spacing between the tracks, has been steadily reduced. To achieve magnetic heads having correspondingly small dimensions, such heads are now being manufactured using thin-film processing of the type used to manufacture integrated circuits in silicon substrates. The resulting magnetic heads consist of thin layers of magnetically permeable and substantially magnetically impermeable materials.

To achieve track alignment between the read and write magnetic heads used in conjunction with magnetic tapes, it has been proposed that a read head be integrally combined with a write head in a unitary structure. This combined read/write head, fabricated using thin-film processing, is described in C. H. Bajorek et al, "An Integrated Magnetoresistive Read, Inductive Write High Density Recording Head", Published Proceedings of 20th Annual Conference on Magnetism and Magnetic Materials, American Institute of Physics, New York, 1975, pp. 548–549. As shown in FIG. 1, the Bajorek et al combined read/write head 10 is formed on a nonmagnetic substrate 20 and includes a read head consisting of magnetically permeable, permalloy layers 30 and 60 separated by a layer of substantially magnetically impermeable silicon dioxide 40, which defines the read gap of the read head. An MRE film 50 and an overlying permanent magnet film 55 are buried in the silicon dioxide layer 40. The permanent magnet film serves to magnetize the MRE film in a direction which is at 45 degrees to the direction of current flow in the MRE film.

The Bajorek et al combined read/write head 10 also includes a write head consisting of the permalloy layer 60, shared with the read head, an overlying hard gold layer 80, which defines the write gap, and another, overlying permalloy layer 90. Here, the permalloy layers 60 and 90 serve as the poles of the write head. A layer of soft gold 70, buried in the hard gold layer 80, constitutes a one-turn write coil.

Significantly, when writing information onto a magnetic medium 100 with the write head of the combined read/write head 10, the permalloy layers 60 and 30 serve to shield the MRE film 50 from the flux produced by the write head, and from other stray flux. On the other hand, when reading information on the magnetic medium 100 with the read head of the combined read/write head 10, flux emanating from the magnetic medium 100 is not communicated to the MRE film 50 by the permalloy layers 60 and 30 because, as before, these layers serve to shield the MRE film 50 from the flux. Rather, the only flux which reaches the MRE film 50 is that emanating from the magnetic medium 100 which directly impinges upon the MRE film 50.

While the Bajorek et al combined read/write head 10 has advantageous features, it has at least one significant disadvantageous feature. That is, when a magnetic tape is drawn past the read gap, the material of the read gap undergoes wear. Because the MRE film 50 is located in the read gap, it too undergoes wear and a corresponding degradation in sensitivity. This wear of the MRE film 50 generally precludes commercial viability.

A thin-film read head which avoids wear of the MRE is disclosed in Japanese Kokai 63-37811, published on Feb. 18, 1988 and listing Hiroaki Yoda as inventor. As depicted in FIG. 2, the Yoda read head 110 is formed on a nonmagnetic substrate 120 and includes a layer 130 (having an undisclosed composition and function) overlying the substrate 120. An MRE 140 overlies the layer 130, while an electrically insulating layer 150 overlies the MRE 140. It is assumed that the MRE 140 is a single-domain magnetic element (rather than a multi-domain element) and is thus relatively sensitive to the magnetic fields to be sensed.

The Yoda read head 110 also includes a broken (discontinuous) flux guide having sections 160a and 160b, each of which overlies the insulating layer 150 and partially overlaps the MRE 140. An electrically insulating layer 170 overlies the broken flux guide and defines the read gap of the read head 110. An electrical conductor 180, buried within the insulating layer 170, serves to produce a biasing magnetic field for the MRE 140. A continuous flux guide 190 overlies the insulating layer 170.

In the operation of the Yoda read head 110, the flux guides 190, 160a and 160b serve to communicate flux emanating from a magnetic medium 200, e.g., a magnetic tape, to the MRE 140. That is, flux enters the continuous flux guide 190, is communicated to flux guide section 160b, which communicates it to MRE 140, which in turn communicates it to flux guide section 160a.

As is evident from FIG. 2, the MRE 140 of the Yoda read head is located outside the read gap, and is therefore not subject to MRE wear and degradation. Therefore, in light of the teachings of the Bajorek et al article, it would appear that a commercially viable read/write head, in which the MRE does not undergo wear, is readily achieved by combining a write head with the Yoda read head, with the continuous flux guide 190 (see FIG. 2) being common to both the read head and the write head. However, when this is done, new, previously unrecognized, significant problems arise, as discussed below.

SUMMARY OF THE INVENTION

The invention involves a combined read/write head in which the read head is similar to the Yoda read head and the write head overlies the read head. Preferably, the top flux guide of the read head is shared with, and serves as the bottom pole of, the write head.

The invention involves the finding that when a write head is combined with the Yoda read head, the resulting magnetic circuit is such that, in general, a significant amount of the flux generated by the write head during writing is communicated to the MRE 140 via the flux guide 190 and flux guide sections 160b and 160a (see FIG. 2). As a consequence, the MRE 140 is destabilized, i.e., converted from a single-domain element to a multi-domain element, which results in substantially reduced MRE sensitivity.

In this regard, it has been found that such destabilization is avoided provided the amount of flux communicated to the MRE results in a corresponding flux density equal to or less than about 10,000 gauss, and preferably equal to or less than about 6,000 gauss, a standard hereinafter referred to as the MRE stability standards.

The invention also involves the finding that the above magnetic circuit also leads to the write head (unintentionally) functioning as a read head. That is, during reading, flux from a portion of, for example, a magnetic tape positioned adjacent the write head is communicated via the flux guide 190 and flux guide sections 160b and 160a to the MRE 140. As a consequence, the MRE generates spurious signals, which substantially degrades signal-to-noise ratio.

In this regard, it has been found that if the amount of flux communicated via the write head (acting as a read head) to the MRE results in about 10 percent or less, and preferably about 5 percent or less, of the signal output of the MRE, then the corresponding signal and signal-to-noise ratio is commercially acceptable, a standard hereinafter referred to as the signal standard.

The invention still further involves the finding that the above-described problems are avoided, i.e., the MRE stability standard and the signal standard are simultaneously achieved, while also achieving a relatively sensitive read head, by a subtle choice of thickness dimensions for the various layers constituting the combined read/write head, as well as a subtle choice for the amount of overlap between each of the broken flux guide sections of the read head and the MRE.

The present invention, described below, largely precludes flux generated by, or entering, the write head from being communicated via the shared flux guide to the MRE. On the other hand, this same choice of thickness dimensions and of overlap between each of the broken flux guide sections of the read head and the MRE, permits flux which is to be sensed to be efficiently communicated to the MRE during reading via the shared flux guide, and permits the read head to exhibit relatively high sensitivity.

BRIEF DESCRIPTION OF THE DRAWINGS

The invention is described with reference to the accompanying drawings, wherein.

DETAILED DESCRIPTION OF THE PREFERRED EMBODIMENT

Figure 1:
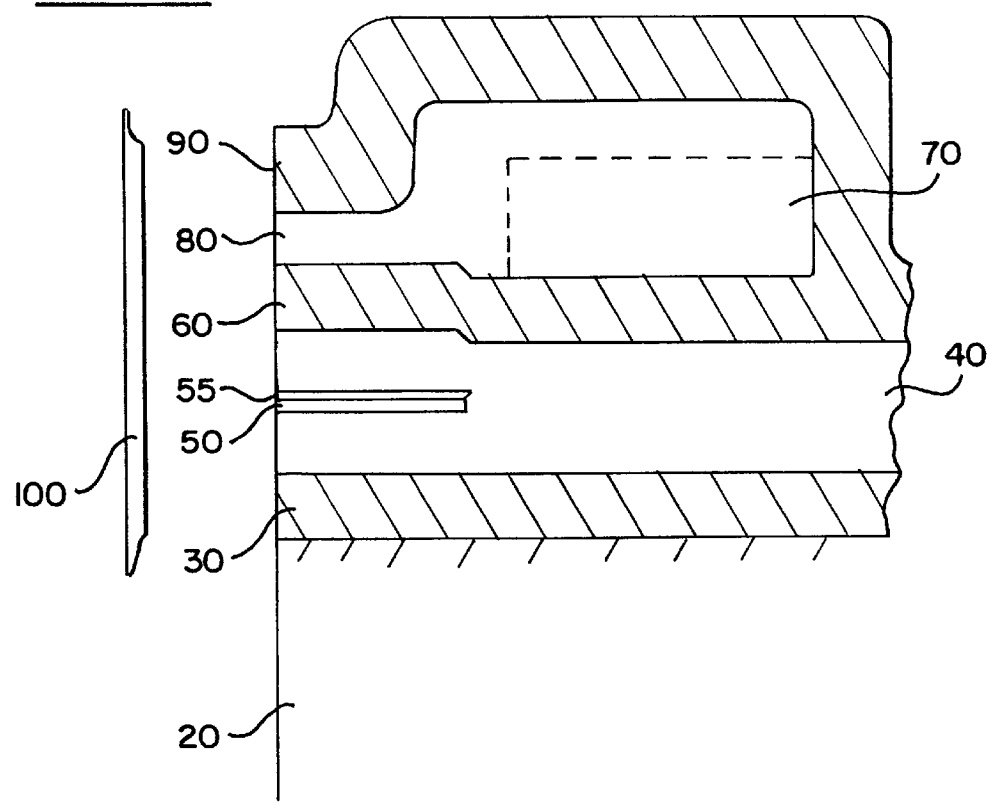
FIG. 1 is a cross-sectional view of the combined read/write head disclosed in the Bajorek et al article.
Figure 2:
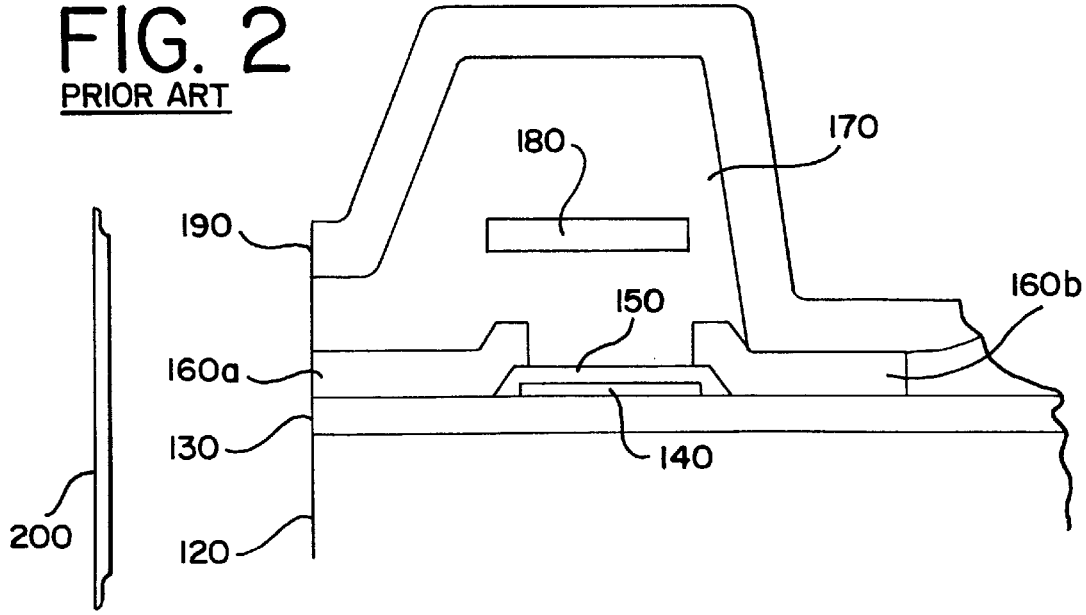
FIG. 2 is a cross-sectional view of the Yoda read head.
Figure 3:
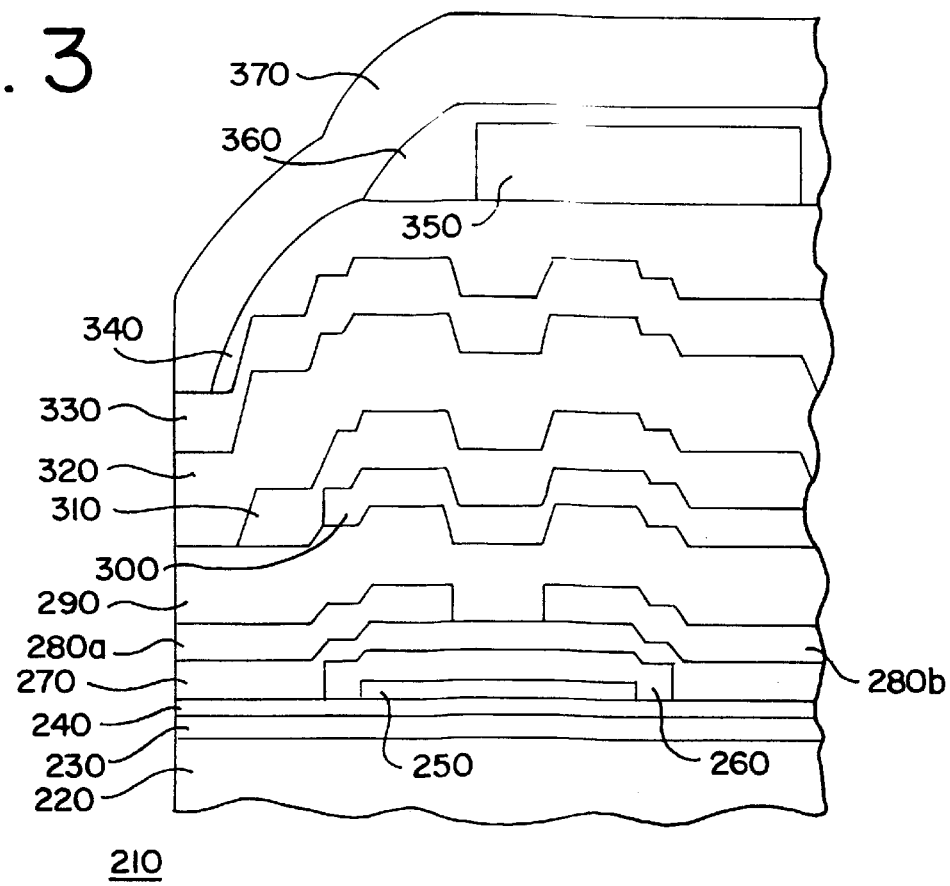
FIG. 3 is a diagrammatic cross-sectional view of one embodiment of the combined read/write head of the present invention.

With reference to FIG. 3, a preferred embodiment of the inventive read/write head 210 of the present invention includes a substrate 220 of substantially magnetically impermeable material, such as the material sold under the tradename Alsimag by 3M of Minneapolis. (For purposes of the present invention, a material is substantially magnetically impermeable if its permeability is less than about 2.) As is known, the composition of Alsimag includes TiC as well as $Al_2O_3$, $SiO_2$ and MgO.

When purchased, the surface of an Alsimag substrate is usually nonplanar, i.e., the surface typically includes 5 micrometer ($\mu$m)-deep concavities, called "pullouts". In order to provide a substantially planar surface on which to deposit the MRE of the present invention, and to provide electrical insulation between the MRE and the Alsimag substrate, a relatively thick layer 230 of electrically insulating and substantially magnetically impermeable material, such as a layer of $Al_2O_3$, is deposited, e.g., sputter deposited, onto the Alsimag substrate. (A material is electrically insulating, for purposes of the present invention, if its resistivity is greater than about $10^6$ $\mu\Omega$-cm.) The initial thickness of the layer 230 is 14–20 $\mu$ms.

After being deposited, the surface of the layer 230 is polished to achieve a relatively smooth surface on which to deposit the MRE. The resulting thickness of the layer 230 is 8–15 $\mu$ms. Unfortunately, conventional polishing techniques usually leave 0.5 $\mu$m-deep, sharp-cornered scratches (indentations) in the surface of the layer 230, which are undesirable because the sharp corners serve as pinning sites for magnetic domain walls, resulting in a multi-domain MRE. To smooth out the sharp corners, a 1 μm-thick layer 240 of electrically insulating and substantially magnetically impermeable material, e.g., a 1 μm thick layer of $Al_2O_3$, is deposited onto the layer 230.

The read head of the present invention includes a substantially single-domain MRE 250 of magnetically permeable material, such as permalloy, directly overlying the layer 240. (A magnetically permeable material, for purposes of the present invention, is one having a permeability equal to or greater than about 100. In addition, a substantially single-domain MRE, for purposes of the present invention, is one which has no more than one domain in the active area. By contrast, a destabilized or multi-domain MRE, for purposes of the present invention, is one which has more than one domain in the active area.) If the MRE 250 is of permalloy, then the composition of the permalloy is, for example, 18–22 percent Fe and 82–78 percent Ni. The MRE 250 is readily deposited, in the form of a substantially single-domain element, onto the layer 240 using conventional techniques, such as the magnetron sputter deposition technique. The thickness of the MRE 250 is between about 0.025 and 0.08 μms, preferably 0.03 to 0.035 μms. The length of the MRE 250, i.e., the dimension parallel to the plane of FIG. 3 and transverse to the MRE thickness direction, is, for example, about 120–200 μms, preferably about 160 μms. The width of the MRE is typically about 5–25 μms.

The MRE 250 is preferably provided with a barber pole configuration of conductive strips 260, one of which is shown in FIG. 3. The conductive strips include, for example, successive layers of Mo, Au and Mo, having thicknesses of, respectively, 0.03 μm, 0.23 μm and 0.09 μm. The width of each conductive strip is in the range of about 2–6 μms, the spacing between successive strips is about 5–15 μms and the angle between each conductive strip and a longitudinal direction of the MRE, along which the MRE is magnetized, is 40°–50°. The barber pole configuration is achieved by first depositing continuous layers of Mo, Au, and Mo, using conventional deposition techniques, e.g., conventional sputter deposition techniques, and then patterning the layers into a barber pole pattern using conventional etching techniques.

The barber pole produces a longitudinal aligning field coinciding with the easy axis of magnetization of the MRE, thus insuring stability of the MRE during normal operation of the combined read/write head.

Electrical insulation for the conductive strips 260 is provided by depositing a layer 270 of electrically insulating and substantially magnetically impermeable material, e.g., a layer of $Al_2O_3$, onto the conductive strips using conventional deposition techniques. The thickness of the layer 270 is about 0.3–0.6, preferably 0.35 μms.

The read head of the present invention also includes a broken (discontinuous) flux guide, including flux guide sections 280a and 280b, overlying the electrically insulating layer 270. The flux guide sections are of magnetically permeable material such as permalloy, the composition being, for example, 19.2 percent Fe and 80.8 percent Ni. The flux guide sections 280a and 280b are formed, for example, by initially depositing a continuous flux guide layer and then etching away a central strip of deposited material, or by using conventional selective deposition techniques. The thickness of each flux guide section is about 0.2–3.0 μms, preferably about 0.4 μm. The width of each flux guide section is typically about 60–180 μms.

As shown in FIG. 3, it is essential that each of the flux guide sections 280a and 280b partially overlaps the MRE 250 in order to couple flux into the MRE. The amount of overlap between each flux guide section and the MRE is preferably equal to about 2.0–8.0 μms, preferably about 2.5 μm.

The read head of the present invention also includes a read gap defined by a layer 290 of substantially magnetically impermeable material, e.g., a layer of $Al_2O_3$, deposited onto the broken flux guide using conventional techniques. The thickness of the layer 290 is about 0.2–0.9 μms, preferably about 0.38–0.4 μms.

Preferably, the read head of the present invention includes a test/biasing electrical conductor 300 overlying the read gap layer 290. (An electrical conductor, for purposes of the present invention, is a structure which includes material having an electrical resistivity equal to or less than about 100 $\mu\Omega$-cm.) This conductor 300 is useful, for example, in generating magnetic fields for testing the MRE 250, and for generating a magnetic field for biasing the MRE 250, so as to linearize the signal output from the MRE. In either event, the magnetic field or fields generated by the conductor 300 are communicated to the MRE 250 via the continuous flux guide (discussed below) and broken flux guide of the read head. The test/biasing conductor 300 includes, for example, successive layers of Mo, Au and Mo, having thicknesses of, respectively, 0.03 μm, 0.23 μm and 0.09 μm. The width of the test/biasing conductor is typically between about 10 μms and 50 μms.

Electrical insulation for the test/biasing conductor 300 is provided by depositing a layer 310 of electrically insulating and substantially magnetically impermeable material, e.g., a layer of $Al_2O_3$, onto the test/biasing conductor. The thickness of the layer 310 is about 0.3–0.9 μms, preferably about 0.4 μms.

The read head of the present invention further includes a continuous flux guide 320, which overlies the electrically insulating layer 310. As noted, the flux guide 320 is shared by, and serves as the bottom pole of, the write head of the present invention. The continuous flux guide 320 is of magnetically permeable material, such as permalloy, having a composition of, for example, 19.2 percent Fe and 80.8 percent Ni. The continuous flux guide 320 is readily deposited using conventional techniques, e.g., plating. The thickness of the continuous flux guide is about 2.0–4.0 μms, preferably about 3.0 μms. The width of the continuous flux guide is typically about 160–600 μms, preferably about 180 μms. Although not shown in FIG. 3, the continuous flux guide 320 extends either into direct physical contact with, or into close proximity to, flux guide section 280b so as to provide a low reluctance path between the two flux guides.

In addition to the bottom pole (continuous flux guide) 320, the write head of the combined read/write head 210 of the present invention includes an overlying layer 330 of substantially magnetically impermeable material, e.g., a layer of $Al_2O_3$, which defines the write gap of the present invention. The layer 330 has a thickness of about 0.4–1.0 μm, preferably about 0.5–0.7 μm, and is readily deposited using conventional techniques.

As shown in FIG. 3, the upper surface of the write gap layer 330 is nonplanar, which is a consequence of the nonplanarity introduced by the broken flux guide of the read head. While it is possible to deposit a conductor, to serve as a one-turn write coil, directly onto the write gap layer, the resulting nonuniformity in the height position of the conductor would generally preclude the possibility of using the same conductor (as a one-turn write coil) in conjunction with a plurality of adjacent write heads. In addition, if the conductor is deposited directly onto the nonplanar, upper surface of the write gap layer using, for example, conventional electroplating techniques, then the composition of the deposited conductor will generally be non-uniform, which is undesirable. Therefore, a planarization layer 340 of substantially magnetically impermeable, electrically insulating material is first deposited onto the write gap layer 330. One such useful planarization layer is of photoresist material, such as the photoresist material sold under the tradename AZ4340 by AZ HOECHST of Sommerville, N.J. The photoresist layer is readily deposited using conventional spin-deposition techniques and has a thickness of about 2–4 $\mu$ms.

An electrical conductor 350, which serves as a one-turn write coil, is readily formed on the planarization layer 340 by depositing a layer of electrically conductive material, e.g., a layer of Cu or Au, onto the planarization layer 340. The conductor 350 is readily deposited using conventional electroplating techniques and has a thickness of about 2–4 $\mu$ms.

To prevent short-circuiting of the one-turn write coil 350 to the top write pole of the write head, a layer 360 of electrically insulating, substantially magnetically impermeable material is deposited onto the one-turn write coil. The layer 360 is, for example, of photoresist material, as discussed above. The thickness of the layer 360 is about 2–4 $\mu$ms.

The write head of the present invention further includes a write top pole 370 directly overlying the layer 360. The top pole 370 is of magnetically permeable material, such as permalloy, the composition being, for example, 19.2 percent Fe and 80.8 percent Ni. The thickness of the top pole 370 is about 2.0–4.0 $\mu$ms, preferably about 3.0 $\mu$ms and its width is typically about 160–600 $\mu$ms. Although not shown in FIG. 3, the right side (as viewed in FIG. 3) of the top pole 370 extends either into direct physical contact with, or into close proximity to, the bottom pole 320 so as to provide a low reluctance path between the poles.

It must be emphasized that the preferred embodiment of the read/write head, having the dimensions given above, readily achieves the MRE stability standard described above, i.e., during writing, the flux density at the MRE 250 is less than about 10,000 gauss, and even less than about 6,000 gauss, and thus MRE destabilization is avoided. In addition, during reading, the preferred embodiment readily achieves the signal standard described above, i.e., less than about 10 percent, and even less than about 5 percent, of the signal output of the MRE 250 is due to the flux communicated by the write head (acting as a read head) to the MRE.

It must also be emphasized that the combination of dimensions, given above, is definitely subtle and that even small deviations can be significant. For example, if the thickness of the write gap layer 330 were increased by 1.0 $\mu$m, then, when writing with the write head, the flux density at the MRE 250 would be increased by approximately 3040 gauss, which is obviously undesirable. Similarly, if the thickness of the (shared) continuous flux guide 320 were to be increased by 1.0 $\mu$m, then, during writing, the flux density at the MRE 250 would be increased by about 668 gauss. In addition, if the overlap between each of the flux guide sections 280$a$, 280$b$ and the MRE 250 were increased by 1.0 $\mu$m, then, during writing, the flux density at the MRE 250 would be increased by about 522 gauss. Moreover, if the thicknesses of the broken flux guide sections 280$a$, 280$b$, or the thickness of the write top pole 370, were increased by 1.0 $\mu$m, then, during writing, the flux density at the MRE 250 would be increased by about 320 gauss.

Figure 4:
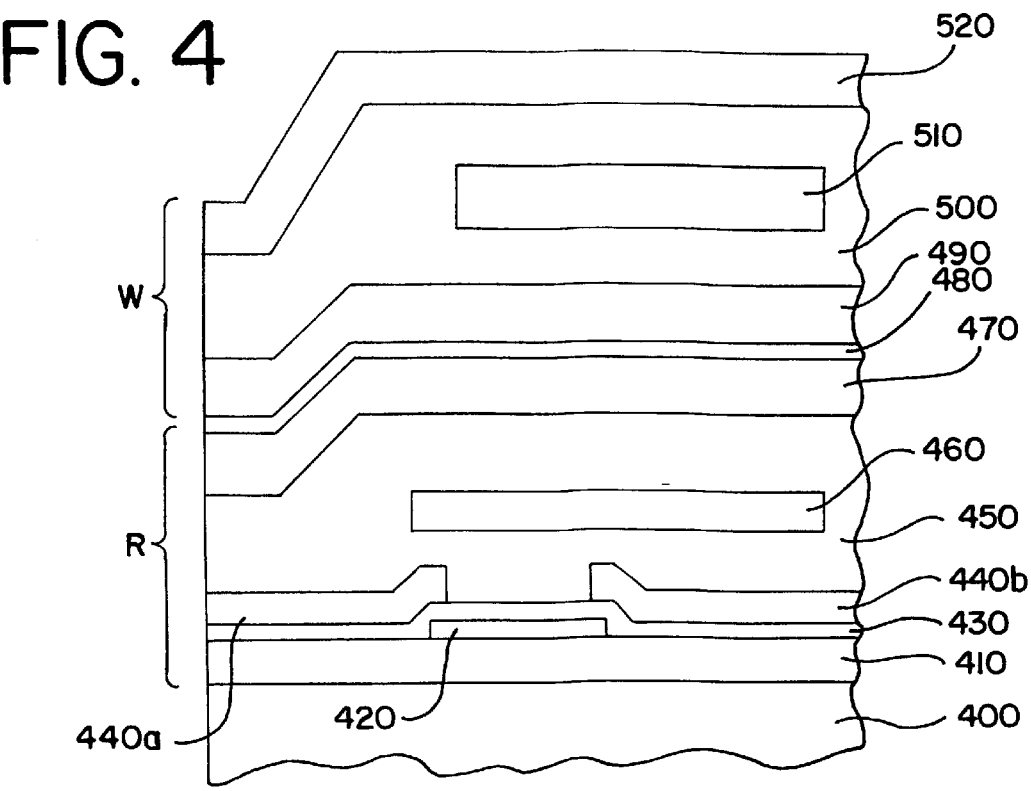
FIG. 4 is a diagrammatic cross-section of another embodiment of the read/write head of the invention.

The invention has been described in terms of a combined read/write head having a shared (common) flux guide. Other embodiments are also possible. For example, a four pole read/write head, such as that shown diagrammatically in FIG. 4, is contemplated.

Substrate 400 supports smooth-surfaced planar layer 410, both layers of substantially magnetically impermeable material, and layer 410 also being electrically insulating. Layer 410 supports MRE 420, which partially underlies broken flux guide sections 440$a$ and 440$b$, and is insulated electrically therefrom by layer 430. Test/bias conductor 460 is buried in read-gap layer 450. Flux guide 470 completes the read head portion R of the combined read/write head.

The write head portion W includes bottom and top write poles 480 and 520, and write coil 510, buried in write-gap defining layer 500. The layer thicknesses and MRE overlap with the broken flux guide sections fall within the ranges specified for corresponding layers of FIG. 3. The upper flux guide 470 of the read head and bottom pole 490 of the write head each have the same thickness dimensions as the shared flux guide of FIG. 3. The read and write heads are separated by a substantially magnetically impermeable, electrically insulating layer 480, such as $Al_2O_3$, having a thickness typically in the range of about 2–8 $\mu$ms.

Within these ranges, the MRE stability standard and signal standard of the invention are achieved. In addition, despite the increased number of layers and larger overall thickness of the combined read/write head of FIG. 4, it has the advantage of considerably less sensitivity of the MRE flux density to changes in layer thicknesses and MRE overlap than the shared flux guide embodiment of FIG. 3.

Other variations within the scope of the description and the appended claims will become apparent to those skilled in the art.

What is claimed:

1. A read/write magnetic head, comprising:
   a substrate of substantially magnetically impermeable material;
   a magnetic read head overlying said substrate, said magnetic read head including a combination of a first broken flux guide of magnetically permeable material, a second unbroken flux guide of magnetically permeable material overlying the first flux guide, and a first region of substantially magnetically impermeable material positioned between said first and second flux guides, said first region of material defining a read gap between said first and second flux guides at one end of said read/write magnetic head;
   a magnetic write head overlying said magnetic read head, said magnetic write head including a combination of a first pole, an overlying second pole of magnetically permeable material and a second region of substantially magnetically impermeable material positioned between said first and a second poles, said second region of material defining a write gap between said first and second poles at said one end of said read/write magnetic head,
   said read/write magnetic head further comprising a substantially single-domain magnetoresistive element (MRE) positioned between said first flux guide and said substrate, said first flux guide including two flux guide sections, each of which partially overlaps said MRE; the flux density at said MRE during writing being equal to or less than about 10,000 gauss, whereby destabilization of said MRE when writing with said write head is prevented.

2. The read/write magnetic head of claim 1, wherein said flux density is equal to or less than about 6,000 gauss.

3. The read/write magnetic head of claim 1, wherein the first pole of the write head includes the second flux guide.

4. The read/write magnetic head of claim 1, wherein at least a portion of said substantially magnetically impermeable material of said substrate is electrically insulating and said MRE overlies said portion.

5. The read/write magnetic head of claim 1, wherein said MRE is a barber pole MRE.

6. The read/write magnetic head of claim 1, further comprising an electrical conductor positioned between said first and second flux guides and capable of magnetic communication with said MRE via said first and second flux guides.

7. The read/write magnetic lead of claim 1, further comprising an electrical conductor positioned between said first and second poles.

8. The read/write magnetic head of claim 7, further comprising a third region of substantially magnetically impermeable material, having a substantially planar upper surface, positioned between said first and second poles and overlying said second region, said electrical conductor overlying said upper surface.

9. The read/write magnetic head of claim 1 in which the MRE thickness is in the range of about 0.25 to 0.80 $\mu$ms.

10. The read/write magnetic head of claim 1 in which the thickness of the broken flux guide is in the range of about 0.20 to 3.0 $\mu$ms.

11. The read/write magnetic head of claim 1 in which the overlap between the MRE and the broken flux guide sections is in the range of about 2.0 to 8.0 $\mu$ms.

12. The read/write magnetic head of claim 1 in which the thickness of the continuous flux guide, the first pole and the second pole are in the range of about 2.0 to 4.0 $\mu$ms.

13. The read/write magnetic head of claim 1 in which the thickness of the read gap is in the range of about 0.2 to 0.9 $\mu$ms.

14. The read/write magnetic head of claim 1 in which the thickness of the write gap is in the range of about 0.4 to 1.0 $\mu$ms.

15. A read/write magnetic head, comprising:
   a substrate of substantially magnetically impermeable material;
   a magnetic read head overlying said substrate, said magnetic read head including a combination of a first flux guide of magnetically permeable material, an overlying second flux guide of magnetically permeable material and a first region of substantially magnetically impermeable material positioned between said first and second flux guides, said first region of material defining a read gap between said first and second flux guides at one end of said read/write magnetic head;
   a magnetic write head overlying said magnetic read head, said magnetic write head including a combination of a first pole, an overlying second pole of magnetically permeable material and a second region of substantially magnetically impermeable material positioned between said first and second poles, said second region of material defining a write gap between said first and second poles at said one end of said read/write magnetic head, Characterized In That
   said read/write magnetic head further comprises a magnetoresistive element (MRE) positioned between said first flux guide and said substrate, said first flux guide being a broken flux guide which includes two flux guide sections, each of which partially overlaps said MRE; the flux communicated to said MRE via said write head when reading with said read head, resulting in about 10 percent or less of the signal output of said MRE.

16. The read/write magnetic head of claim 15, wherein said dimensions and said overlap are chosen so that when reading with said read head, flux communicated to said MRE via said write head results in about 5 percent or less of the signal output of said MRE.

17. The read/write magnetic head of claim 15, wherein the first pole of the write head includes the second flux guide.

18. The read/write magnetic head of claim 15, wherein at least a portion of said substantially magnetically impermeable material of said substrate is electrically insulating and said MRE overlies said portion.

19. The read/write magnetic head of claim 15, wherein said MRE is a barber pole MRE.

20. The read/write magnetic head of claim 15, further comprising an electrical conductor positioned between said first and second flux guides and capable of magnetic communication with said MRE via said first and second flux guides.

21. The read/write magnetic head of claim 15, further comprising an electrical conductor positioned between said first and second poles.

22. The read/write magnetic head of claim 21, further comprising a third region of substantially magnetically impermeable material, having a substantially planar upper surface, positioned between said first and second poles and overlying said second region, said electrical conductor overlying said upper surface.

23. The read/write magnetic head of claim 15 in which the MRE thickness is in the range of about 0.25 to 0.80 $\mu$ms.

24. The read/write magnetic head of claim 16 in which the thickness of the broken flux guide is in the range of about 0.20 to 3.0 $\mu$ms.

25. The read/write magnetic head of claim 15 in which the overlap between the MRE and the broken flux guide sections is in the range of about 2.0 to 8.0 $\mu$ms.

26. The read/write magnetic head of claim 15 in which the thickness of the continuous flux guide, the first pole and the second pole are in the range of about 2.0 to 4.0 $\mu$ms.

27. The read/write magnetic head of claim 15 in which the thickness of the read gap is in the range of about 0.2 to 0.9 $\mu$ms.

28. The read/write magnetic head of claim 15 in which the thickness of the write gap is in the range of about 0.4 to 1.0 $\mu$ms.

* * * * *